United States Patent [19]

Ezell

[11] 4,318,656
[45] Mar. 9, 1982

[54] EQUIPMENT TRAILER WITH SHIFTABLE TRAILER BED

[76] Inventor: Charles R. Ezell, Rte. 1, P.O. Box 69, Sondheimer, La. 71276

[21] Appl. No.: 105,571

[22] Filed: Dec. 20, 1979

[51] Int. Cl.³ .............................................. B60P 1/34
[52] U.S. Cl. ................................. 414/471; 280/677; 414/477; 414/481; 414/483; 414/495
[58] Field of Search ............................... 414/474–485, 414/498–500, 522, 495; 308/3 R, 6 R; 280/677–681

[56] References Cited

U.S. PATENT DOCUMENTS 2,488,002 11/1949 Carraher ............................ 280/677
2,784,857 3/1957 Duffy ................................. 414/481
3,179,271 4/1965 Donahue ........................... 414/495
3,910,436 10/1975 Machan ....................... 280/43.11 X

*Primary Examiner*—Robert G. Sheridan
*Attorney, Agent, or Firm*—Wigman & Cohen

[57] ABSTRACT

A trailer for transporting farm implements and the like is disclosed. The trailer bed is longitudinally shiftable from a horizontal load transporting position mounted on a wheeled chassis to a horizontal loading position on the ground adjacent the chassis by means of a slide assembly pivotable relative to the wheel axle. After loading, the trailer bed is urged up the inclined slide assembly by backing the pulling vehicle, such as a pickup truck. Shifting of the trailer bed on the slide assembly is facilitated by cooperating rollers mounted both on the trailer bed frame and on the slide assembly.

12 Claims, 10 Drawing Figures

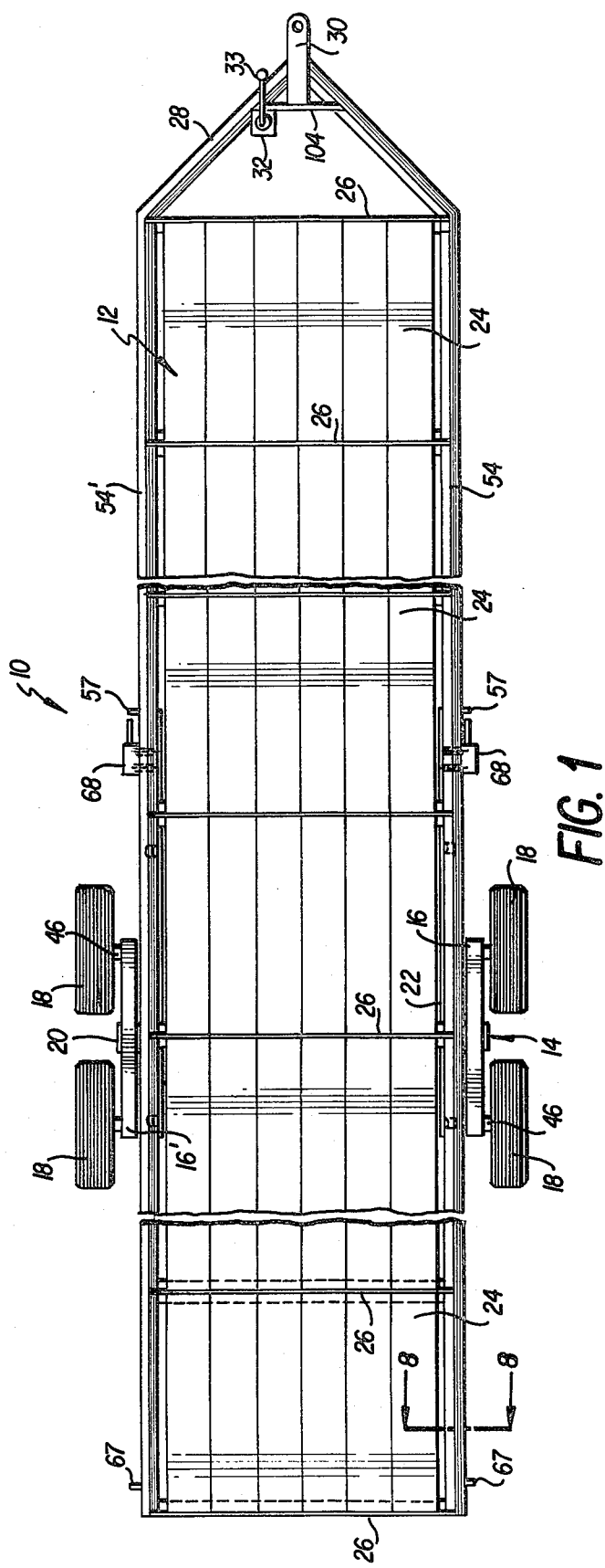
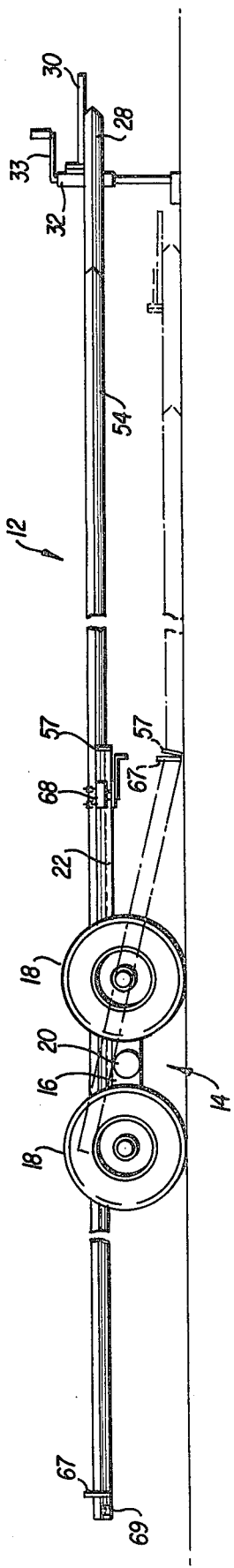

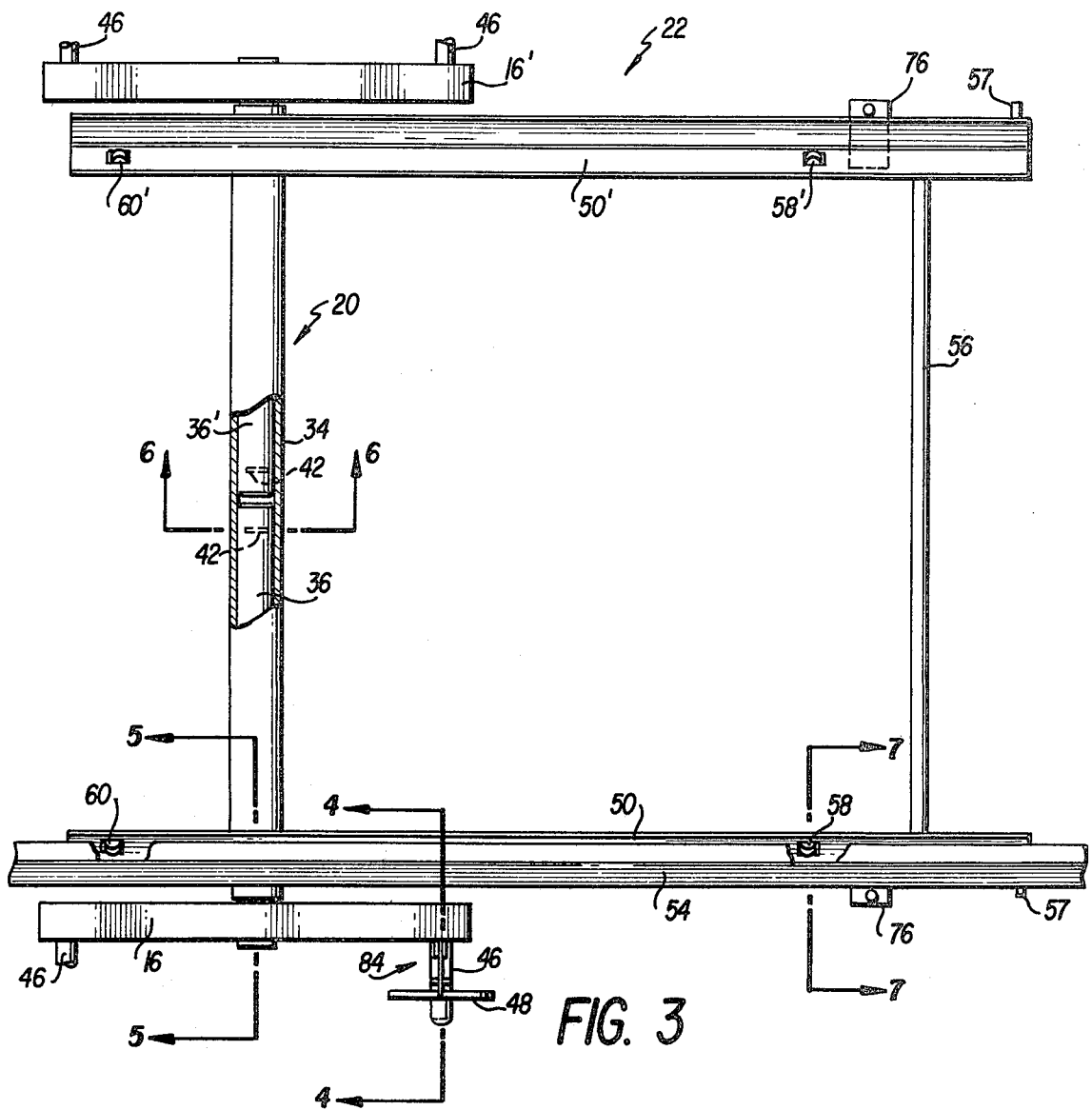
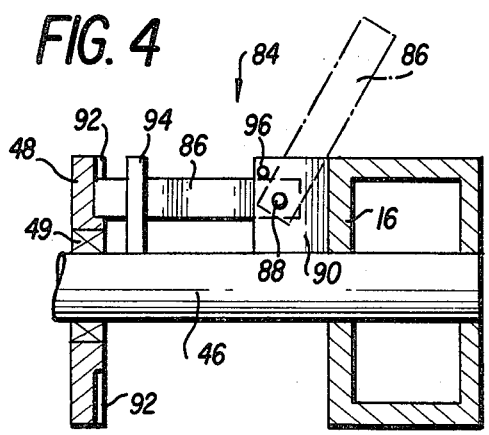
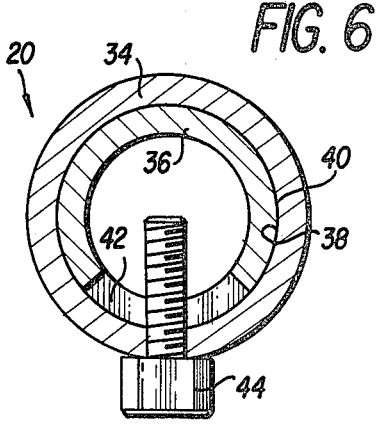

EQUIPMENT TRAILER WITH SHIFTABLE TRAILER BED

BACKGROUND OF THE INVENTION

The present invention relates to trailers for loading and transporting farm implements, construction equipment and other wheeled and tracked equipment and, more particularly, to a trailer of the type wherein the trailer support bed can be lowered or inclined from its normal load transporting height to a lower level or different inclination for loading and unloading.

A search of the prior art failed to uncover any prior art reference which discloses the equipment trailer of the present invention. A number of prior art patents were uncovered which disclose a variety of equipment trailers having depressible, tiltable or otherwise shiftable beds to facilitate loading and unloading of heavy equipment. The following is a listing of the prior art U.S. patents uncovered during the aforementioned search: U.S. Pat. Nos. 2,611,583; 2,743,936; 2,885,216; 3,003,780; 3,199,889; 3,214,047; 3,239,274; 3,380,607; 3,838,868; 3,901,398; 4,040,643; 4,101,158; 4,119,224; 4,125,198.

Typical of the trailer apparatus heretofore known and used for transporting equipment are the trailers disclosed, for example, in the above-listed U.S. Pat. Nos. 3,214,047 and 4,125,198. These trailers are provided with tiltable beds wherein the trailer bed is pivoted or otherwise shifted to a position such that one end of the trailer bed bears against the ground to facilitate driving the equipment to be transported up the inclined trailer bed.

In the case of the trailer disclosed in U.S. Pat. No. 3,214,047, the trailer bed is carried centrally on two pair of wheels, i.e., tandem wheels, and is pivoted about a horizontal axis midway between the tandem wheel pairs so that the rear end of the bed bears against the ground for loading. The pivot axis of the trailer bed is preferably arranged as low to the ground as possible to minimize the angle of inclination of the bed and assure ease of loading and maintenance of a low center of gravity of the load.

U.S. Pat. No. 4,125,198 discloses a trailer bed having an undercarriage which is mounted for reciprocal fore-and-aft movement. A lifting mechanism, such as a hydraulic cylinder, is provided at the forward end of the trailer bed for raising such end until the rear end of the trailer bed comes into contact with the ground so as to provide an incline for loading equipment onto the trailer bed.

Thus, one of the prior art approaches to loading equipment trailers has involved pivoting or otherwise tilting the trailer so that one end thereof bears upon the ground to provide an inclined loading ramp. Improvements to this approach have involved measures to reduce the angle of inclination of the trailer bed to facilitate loading and improve the safety and stability characteristics of the trailer.

SUMMARY AND OBJECTS OF THE INVENTION

In view of the foregoing brief description of prior art equipment trailers, it should be apparent that there still exists a need in the art for an equipment trailer which is characterized by the advantage that the trailer bed is capable of being horizontally positioned in contact with the ground for loading. This arrangement greatly facilitates loading in that there is no need to drive or otherwise propel the equipment to be loaded up an inclined surface and also permits loading from at least two sides and one end of the trailer bed.

It is, therefore, a primary objective of this invention to provide an equipment trailer apparatus having a trailer bed which is longitudinally shiftable from a horizontal transporting position on a tandem-wheeled chassis to a lower horizontal loading position resting on the ground and vice versa.

More particularly, it is an object of this invention to provide a trailer apparatus having a rigid main trailer frame or bed which is slidably or rollably mounted in a slide assembly adapted to be pivoted to an inclined position on the main axle connecting the tandem wheels of the trailer to thereby permit one end of the trailer bed to move downwardly along the inclined slide assembly until the bed engages the ground in a horizontal loading position along its entire length.

It is another object of this invention to provide a trailer bed of the aforementioned type having optimum rigidity, economy and strength by constructing the frame of the bed with rectangular steel tubing arranged or oriented with a diamond cross-section in the load-bearing direction and by constructing the floor platform of the bed with short planks which are not only stronger, but are easier and more economical to replace.

Yet another object of this invention is to provide an equipment trailer apparatus having a trailer bed adapted to be shifted from a horizontal loading position on the ground to a horizontal transporting position on a wheeled chassis by means of a two-wheel drive pickup truck.

Still other objects of the invention relate to novel aspects of the constructional features of the equipment trailer apparatus which provide advantages not found in the known trailer constructions. Such features include a novel jack stand swivel arrangement, wheel lock, slide assembly, bed frame latch and slide assembly pivot arrangement to be more fully described hereinafter.

Briefly described, the aforementioned objects are accomplished according to the invention by providing a four wheel tandem chassis comprising a pair of tubular beams of rectangular cross-section, each having two stub or trunnion axles for rotatably mounting a pair of trailer wheels. The beams are provided with respective inwardly directed tubes (inner axles) which are telescopically received in respective opposite ends of a tubular main axle (outer axle). A frame slide assembly is rigidly affixed to the main or outer axle so as to be pivotable with respect to the wheel beams. The slide assembly comprises a pair of spaced, V-shaped guideways or tracks for receiving the frame of the trailer bed. The guideways and trailer bed frame are each provided with rollers which cooperate to facilitate movement of the trailer bed along the slide assembly.

At least one trunnion axle for each wheel beam is provided with a hub assembly having a wheel lock means to prevent movement of the four-wheeled chassis during movement of the trailer bed along the guideways of the slide assembly. Latches are also provided between the slide assembly and trailer bed frame to maintain the trailer bed and guideways fixed together in secure parallel relation when the trailer bed is in the transporting position.

To shift the trailer bed from the transporting position, the wheel locks are engaged and the trailer bed frame latches are disengaged. A pickup truck or other suitable pulling vehicle is then connected to the tongue of the trailer bed and pulls the trailer bed forwardly along the guideways until the rearward end of the trailer bed rolls past the main axle at which time the weight of the trailer bed will force the slide assembly to pivot until the forward ends of the guideways contact the ground and provide an inclined ramp down which the trailer bed rolls until the rear end of the trailer bed contacts the ground. The slide assembly guideways and trailer bed frame are provided with cooperating stops to prevent the possibility that the trailer bed will slide completely off the ground-engaging ends of the guideways.

In this last-mentioned position, the tongue of the trailer bed is jacked free of or otherwise disconnected from the pickup truck and may then be lowered so that the trailer bed lies in a horizontal position on the ground ready for equipment loading. After the equipment is loaded, the tongue of the trailer bed is jacked up and connected to the pickup truck. The truck is backed to cause the trailer bed to move rearwardly and roll up the guideways into the horizontal transporting position over the tandem trailer wheels.

With these and other objects, advantages and features of the invention that may become hereinafter apparent, the nature of the invention may be more clearly understood by reference to the following detailed description of the invention, the appended claims and to the several views illustrated in the attached drawings, wherein:

BRIEF DESCRIPTION OF THE DRAWINGS

FIG. 1 is a top plan view of the trailer apparatus according to the invention;

FIG. 2 is a side elevational view of the trailer apparatus of the invention showing, in solid lines, the trailer bed and slide assembly in the load transporting position and, in dashed lines, the slide assembly and trailer bed in the loading position;

FIG. 3 is a top plan view partly fragmented showing the tandem-wheeled chassis and slide assembly of the trailer of the present invention;

FIG. 4 is a cross-sectional view taken along line 4—4 of FIG. 3 showing one of the wheel hub locks according to the invention;

FIG. 6 is a cross-sectional view taken along line 6—6 of the main axle shown in FIG. 3;

DETAILED DESCRIPTION OF A PREFERRED EMBODIMENT

Figure 5:
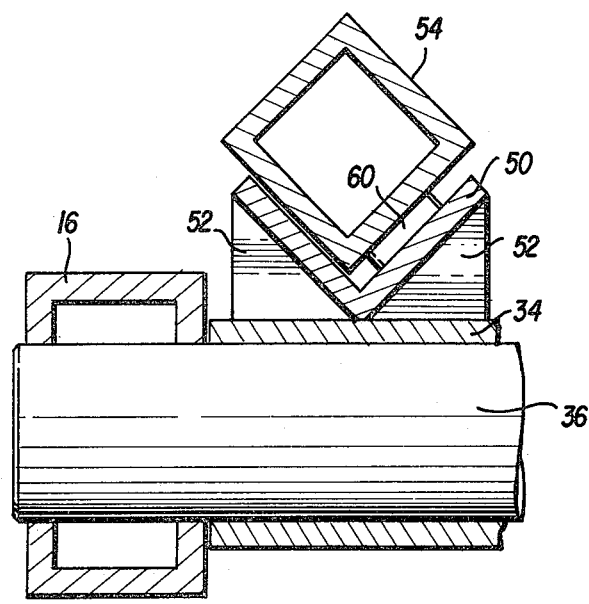
FIG. 5 is a cross-sectional view taken along line 5—5 of FIG. 3 showing the telescoping arrangement of the main axle of the trailer apparatus.
Figure 7:
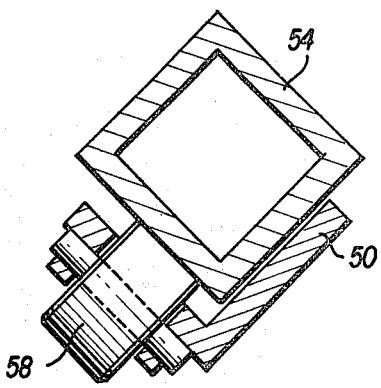
FIG. 7 is a cross-sectional view of a slide assembly roller taken along line 7—7 of FIG. 3.

Referring now in detail to the drawings wherein the same reference characters are used to designate the same parts and elements throughout, there is illustrated in FIGS. 1 and 2 an embodiment of the trailer apparatus according to the invention which is designated generally by reference numeral 10. The trailer apparatus 10 includes a trailer bed 12 and a wheeled trailer chassis 14. The chassis 14 comprises a pair of wheel support beams 16, 16' upon which are rotatably mounted four trailer wheels 18. The wheel support beams are interconnected by a main axle 20 to which is affixed a slide assembly 22 pivotable relative to the axle 20 in a manner to be more fully described hereinafter.

The trailer bed 12 is rollably supported in the slide assembly 22 for longitudinal movement between the equipment transporting position shown in solid lines in FIG. 2 and the equipment loading position shown in dashed lines in FIG. 2.

The platform of the trailer bed is advantageously formed of short (four foot length) planks 24 fixed between angle iron cross braces 26. Such short floor planks are advantageously readily and economically replaced when damaged or otherwise in need of replacement.

The right-hand or forward end of the trailer apparatus 10 forms a V-shaped tongue 28 which is provided with a hitch 30 for connection to a suitable pulling vehicle, such as a pickup truck or the like. A conventional jack stand 32 with hand crank 33 is pivotally mounted to the trailer tongue 28 for raising and lowering the trailer tongue with respect to the pulling vehicle so as to permit engagement and disengagement of the trailer hitch 30 with such vehicle. The jack stand 32 is mounted in offset relation to the longitudinal axis of the trailer bed 12 as shown in FIG. 1 so as to permit pivoting of the extended jack to a horizontal nesting position as further described hereinafter.

Referring now to FIGS. 3-7, the construction and operation of the trailer chassis and slide assembly will be described. As seen best in FIGS. 3 and 6, the main axle 20 includes an outer axle 34 constructed of tubular steel, the opposite ends of which telescopically receive inner tubular steel axles 36, 36' which are rigidly affixed to a respective wheel support beam 16, 16'. The clearance between the inside diameter 38 of the outer axle 34 and the outside diameter 40 of the inner axles 36, 36' is selected to permit relative rotation between the inner and outer axles. Arcuate slots 42 are provided in the inner axles 36, 36' and screws 44 are inserted through threaded bores in the outer axle 34 and extend into an associated slot 42. Screws 44 limit the angular extent of rotation between the inner and outer axles and also prevent the inner axles 36, 36' from sliding laterally or axially out of the outer axle 34.

Each wheel support beam 16, 16' is provided with a pair of trunnion or stub axles 46 upon which wheel hubs 48 (only one shown) and wheels 18 are mounted on bearings 49 (FIG. 4) in a conventional manner.

The slide assembly 22 comprises a pair of spaced, parallel guideways or tracks 50, 50' which are securely and rigidly affixed to the outer axle 34 adjacent a respective end thereof by means of welds and gussets 52 as best shown in FIG. 5. The guideways 50, 50' are formed as V-shaped guides or tracks for receiving the outermost frame elements 54, 54' of the trailer bed frame. A cross brace 56 is provided between the ends of the guideways remote from the outer axle 34 so as to further rigidify the slide assembly. From the foregoing description, it will be appreciated that the slide assembly 22 is pivotable relative to the horizontal wheel support beams 16, 16' so that the right-hand ends of the guideways 50, 50' are permitted to rotate until they simultaneously contact the ground as shown in dashed lines in FIG. 2. Extending outwardly from the forward end of each guideway 50, 50' is a stop member 57.

Referring again to FIGS. 3, 5 and 7, it will be seen that the V-shaped guideways 50, 50' are provided on their innermost sides with forward rollers 58, 58' and rear rollers 60, 60'. The trailer bed frame elements 54, 54' bear on these rollers in such a way that the trailer bed 12 is readily rollable along the slide assembly and thereby shiftable along the longitudinal axis of the trailer. If found necessary or desirable, additional rollers may be provided on the innermost sides of the guideways.

Figure 8:
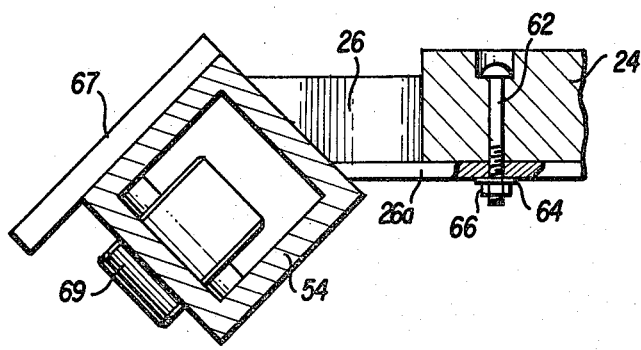
FIG. 8 is a fragmentary cross-sectional view of the trailer bed frame according to the invention taken along line 8—8 of FIG. 1.

The trailer bed frame 12 is advantageously formed with frame elements 54, 54' arranged in diamond-shaped cross section, not only to permit proper engagement with the V-shaped guideways of the slide assembly, but also to improve the overall strength and load carrying capacity of the trailer bed. FIG. 8 shows the manner of connecting the cross braces 26 (which may be T- or L-shaped angle) to the frame element 54 by welds, as well as the manner of securing the floor planks 24 to the horizontal flanges 26a of the braces 26 by means of bolts 62, washers 64 and nuts 66. Also shown in FIG. 8 is a stop 67 and roller 69 mounted near the rear ends of both frame elements 54, 54'. Stops 67 engage stops 57 on the slide assembly 22 as described hereinafter. Other rollers similar to roller 69 may be provided along the frame elements 54, 54'.

Figure 10:
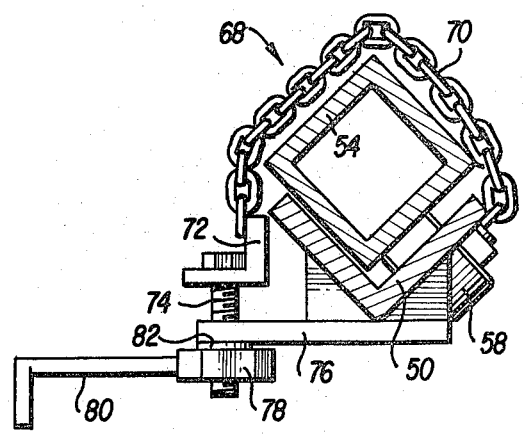
FIG. 10 is a cross-sectional view showing the trailer bed frame and slide assembly latch according to the invention.

When the trailer bed 12 is arranged in the load transporting position, the bed frame elements 54, 54' are secured to the slide assembly by means of a latching assembly 68 shown in FIG. 10. Latching assembly 68 comprises a pair of chains 70 (only one shown in FIG. 10) which are welded at one end to the innermost side of the V-shaped guideway 50 and at the other end to an angle bracket 72. A threaded bolt 74 is welded to bracket 72 and extends through a bore in a plate bracket 76 secured to the guideway 50. A nut 78 having a hand crank 80 affixed thereto is threaded onto the bolt 74 with a washer 82 so that by rotating the nut 78 with the hand crank 80 the chains 70 are drawn tightly about the frame element 54 to maintain the same rigid with the guideway 50 of the slide assembly.

Now referring to FIG. 4, there is shown the manner in which the wheels of the equipment trailer are locked against rotation. Although only one wheel is shown in FIG. 3 with a locking mechanism, it will be understood that at least one wheel on the opposite side of the trailer is preferably locked and it is within the contemplation of the present invention that all wheels could be provided with locking means similar to that shown in FIG. 4.

The locking means designated in its entirety by reference numeral 84 has the general appearance of an electrical blade switch and comprises a locking blade 86 which is pivotally mounted by a pin 88 between a pair of spaced plates 90 welded to wheel support beam 16 and trunnion axle 46. Hub 48 is provided with radial slots 92 into one of which blade 86 is adapted to lockingly engage when pivoted to the horizontal position shown in solid lines in FIG. 4. A pair of fingers 94 welded to axle 46 engage opposite sides of the blade 86 at a point closely adjacent the slots 92 so as to further rigidify the locking means 84. When pivoted to the position shown in dashed lines in FIG. 4, the blade 86 is disengaged from slot 92 so that the wheel hub is free to rotate. A removable pin 96 is disposed between spaced plates 90 to maintain the blade 86 in either the locked or unlocked position. In the locked position, pin 96 prevents clockwise rotation of blade 86 and release of the wheel lock and in the unlocked position prevents counterclockwise rotation of the blade 86 and inadvertent engagement of the wheel lock.

Figure 9:
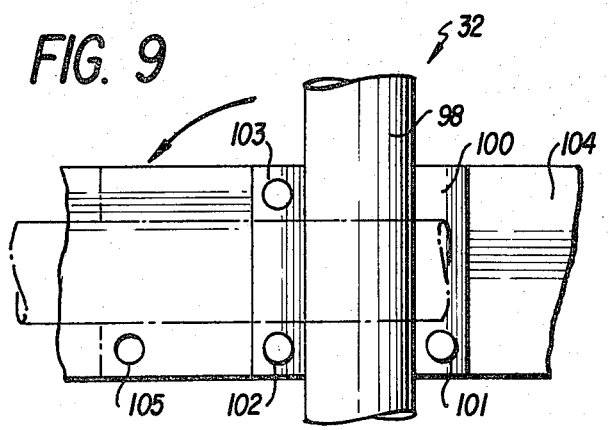
FIG. 9 is a fragmentary view showing the manner of swiveling the jack stand of the trailer apparatus of the invention.

FIG. 9 shows a fragmentary view of the jack stand connection to the trailer tongue. The jack stand shaft 98 is welded to a rectangular plate 100 which is provided at three of its corners with holes 101, 102, 103. Plate 100 is mounted to a vertical plate 104 on the trailer tongue 28 by means of bolts (not shown) which extend through the holes 101, 102, 103 and the correspondingly aligned holes in plate 104. When it is desired to rotate the jack shaft 98 counterclockwise to its horizontal nesting position, the bolts located in holes 101 and 103 are removed and the shaft 98 and plate 100 are rotated 90° counterclockwise so that hole 103 aligns with hole 105 in plate 104 and the bolts are then reinserted in the newly aligned holes such that shaft 98 and plate 100 are positioned as shown in phantom.

OPERATION

With all the elements assembled together as shown in the drawings and as described above, operation of the trailer of the present invention to load equipment onto the trailer bed platform is carried out from the load transporting position shown in solid lines in FIG. 2 in the following manner.

Initially, it will be assumed that the trailer bed hitch 30 is connected to a pulling vehicle, such as a pickup truck, and the jack 32 is arranged in the nested position with the hand crank 33 removed. The two latching assemblies 68 are released by cranking the nuts 78 free of the bolts 74 by means of cranks 80. The chains 70 are completely freed from the frame elements 54, 54' by swinging the same over the frame elements to thus hang downwardly from the inner sides of the guideways 50, 50' of the slide assembly 22. The trailer wheels 18 are then locked in the manner described above in connection with FIG. 4 by operating the wheel locking means 84 of each wheel provided with such locking means.

With the trailer elements positioned as described above, the pulling vehicle is moved forward and the trailer bed 12 will roll forwardly on the guideway rollers 58, 58', 60, 60'. As the trailer bed 12 continues to roll forwardly along the guideways 50, 50', the rollers 69 on the rearward ends of the frame elements 54, 54' and any other rollers that may be provided on the frame elements 54, 54' will rollably engage the guideways on the side of the "V" track opposite the guideway rollers. When the rollers 69 just pass the pivot axis of the slide assembly, i.e., the axis of the main axle 20, the guideways 50, 50' will rock clockwise until the forward ends thereof engage the ground as shown in dashed lines in FIG. 2. Continued forward movement of the trailer bed 12 will cause the same to roll down the inclined guideways until the guideway stops 57 engage the bed frame stops 67 at which point the rear end of the trailer bed contacts the ground surface with the rollers 69 still resting on the guideways.

The jack 32 is then shifted from its horizontal nested position to its operative position and, if necessary, is used to release the hitch 30 from the pulling vehicle and then lower the forward or tongue end of the trailer bed 12 until the same lies horizontally in contact with the ground as shown in dashed lines in FIG. 2. In this position, it is apparent that the trailer bed may be loaded from either side or from the forward or tongue end of the trailer as necessary.

After the trailer bed is loaded, the jack 32 is operated to raise the tongue end of the trailer to a position for connecting to the pulling vehicle. When the hitch 30 is engaged with the pulling vehicle, the vehicle is backed to urge the trailer bed up the inclined guideways to the load transporting position shown in FIG. 2. When in this position, the two latching assemblies 68 are latched to secure the frame elements 54, 54' to the respective guideway 50, 50'. The wheel locking means 84 are then disengaged by placing the blade 86 in the dashed line position shown in FIG. 4 and securing the same in such position with pin 96. The trailer apparatus 10 is ready for transporting the load.

It will be appreciated by those skilled in the art that, under certain conditions and terrain, particularly off the road on farmland or woodland, it will be possible to load the trailer bed 12 while the hitch 30 remains connected to the pulling vehicle. Under these conditions, loading of the trailer bed advantageously is accomplished from the side and preferably at a location closely adjacent the rear end of the trailer bed which is in contact with the ground surface. Also, advantageously, a trailer bed of approximately 36 feet in length can be readily moved up a slide assembly 9 feet long by a standard two wheel pickup truck.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. An equipment trailer especially suitable for transporting farm implements and the like by means of a pulling vehicle such as a pickup truck, comprising:

a wheeled chassis comprising a main axle and a pair of wheel support beams interconnected by said main axle, each beam having at least one wheel rotatably mounted thereto, said main axle comprising a respective inner axle affixed to each wheel support beam and an outer axle telescopically receiving said inner axles at opposite ends thereof, each of said inner axles being rotatable relative to said outer axle and independently of each other;

a slide assembly pivotably mounted to said chassis for pivotal movement about an axis substantially parallel to the main axle; and a trailer bed slidably mounted on the slide assembly such that said trailer bed is longitudinally shiftable along the slide assembly between a load transporting position superposed over said chassis and a horizontal loading position on the ground adjacent said chassis, said trailer bed comprising a frame having a pair of side frame elements with a diamond cross-section, said slide assembly including a pair of parallel guideways arranged longitudinally of the trailer, said guideways each having a V-shaped track for cooperatively receiving a respective side frame element, said guideways and side frame elements being provided with roller means for rollably supporting the trailer bed in said guideways during movement of said trailer bed between said load transporting position and said horizontal loading position.

2. The equipment trailer according to claim 1, including means for releasably locking said inner and outer axles together for limited rotational movement of said outer axle relative to said inner axles.

3. The equipment trailer according to claim 2, wherein said slide assembly is rigidly connected to said outer axle for pivotal movement therewith.

4. The equipment trailer according to claim 1, including cooperating stop means arranged on said trailer bed frame and said slide assembly for preventing disengagement of said trailer bed from said slide assembly.

5. The equipment trailer according to claim 1, including means for securely latching the guideways of said slide assembly in parallel relation to a respective side frame element of the trailer bed frame.

6. The equipment trailer according to claim 1, wherein said trailer bed comprises a frame constructed of rectangular steel tubing, said side frame elements being interconnected by a plurality of parallel flanged angle members, a trailer platform comprising a plurality of planks extending between the flanges of adjacent angle members and means for releasably fastening said planks to said angle members.

7. The equipment trailer according to claim 1, wherein said wheeled chassis includes at least two pair of wheels rotatably mounted to said wheel support beams by stub axles and means provided for each wheel for locking said wheels to prevent rotation thereof, said locking means for each wheel including a rotatable wheel hub having a radial slot therein and a pivotable blade mounted to said chassis for releasably engaging in said slot.

8. The equipment trailer according to claim 7, wherein said pivotable blade means for each locking means is pivotally mounted between a pair of spaced plates, said plates being rigidly secured to the wheel support beam and stub axle associated therewith.

9. The equipment trailer according to claim 1, wherein said trailer bed includes a tongue end portion having a hitch for connecting said trailer bed to the pulling vehicle, jack means mounted to said tongue portion for raising and lowering the same and means mounting said jack means for pivotable movement relative to said tongue end portion from a vertical operative jacking position to a horizontal nesting position.

10. The equipment trailer according to claim 1, wherein said inner axles each have a free end which extends telescopically into said outer axle a distance such that the free ends of the inner axles are in close confronting relation to each other.

11. An equipment trailer especially suitable for transporting farm implements and the like by means of a pulling vehicle such as a pickup truck, comprising:

a wheeled chassis having a main axle;

a slide assembly pivotably mounted to said chassis for pivotal movement about an axis substantially parallel to the main axle, said slide assembly including a pair of parallel guideways arranged longitudinally of the trailer, said guideways each having a V-shaped track;

a trailer bed mounted on the slide assembly, said trailer bed comprising a frame having a pair of side frame elements with a diamond cross-section, said side frame elements being cooperatively received in said guideways; and said slide assembly and trailer bed including means for shifting the trailer bed longitudinally along the slide assembly between a load transporting position superposed over said chassis and a horizontal loading position on the ground adjacent said chassis, said shifting means including roller means mounted on said guideways and said side frame elements for rollably supporting the trailer bed in said guideways during movement of said trailer bed between said load transporting position and said horizontal loading position.

12. The equipment trailer according to claim 1, wherein said roller means comprise at least one roller rotatably mounted on each of said guideways and each of said side frame elements, the axes of rotation of the rollers on the guideways being arranged substantially at right angles to the axes of rotation of the rollers on the side frame elements.

* * * * *